Dec. 24, 1940.  C. L. MACK  2,226,063
TRACTOR GUIDE
Filed Jan. 23, 1940   2 Sheets-Sheet 1
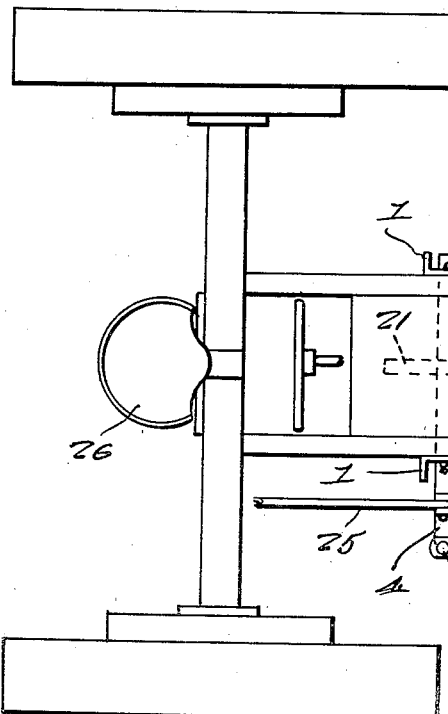
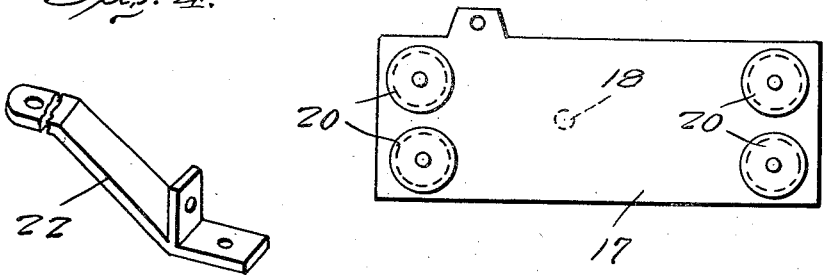
Inventor
*Carl Lavon Mack*
By *Clarence A. O'Brien
and Hyman Berman*
Attorneys

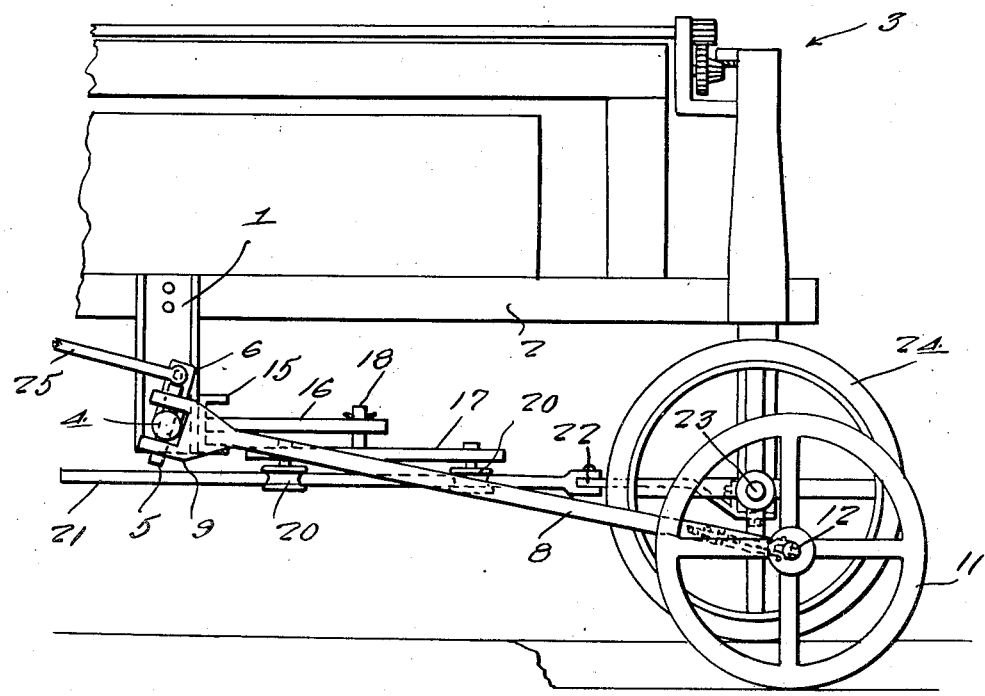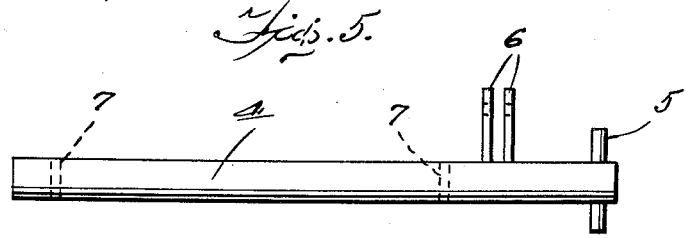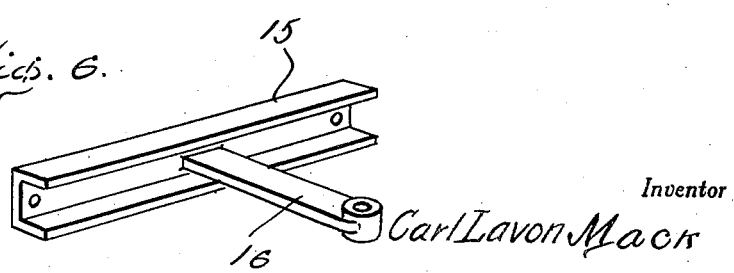

Patented Dec. 24, 1940

2,226,063

UNITED STATES PATENT OFFICE 2,226,063

TRACTOR GUIDE

Carl Lavon Mack, Wapakoneta, Ohio

Application January 23, 1940, Serial No. 315,274

4 Claims. (Cl. 97—49)

The present invention relates to new and useful improvements in guides for farm tractors of the row crop type and has for its primary object to provide, in a manner as hereinafter set forth, an apparatus of this character embodying a novel construction for automatically steering the tractor along a previously plowed furrow.

Another very important object of the invention is to provide an automatic guide of the aforementioned character which is adapted to permit the front end of the tractor to be driven up close to a fence, building or other obstruction when making a turn.

Still another very important object of the invention is to provide an automatic tractor guide of the character described wherein the angle of the furrow wheel may be conveniently adjusted as desired.

A still further important object of the invention is to provide a tractor guide of the aforementioned character which is adapted to be raised and lowered from the operator's seat of the tractor.

Other objects of the invention are to provide an automatic tractor guide which will be comparatively simple in construction, strong, durable, highly efficient and reliable in use, compact, light in weight and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a top plan view of a guide constructed in accordance with the present invention, showing the device installed for operation on a tractor.

Figure 2 is a view in side elevation.

Figure 3 is a bottom plan view of the rotatably mounted plate.

Figure 4 is a detail view in perspective of the steering arm.

Figure 5 is an elevational view of the rotary shaft.

Figure 6 is a perspective view of the supporting means for the rotary plate.

Referring now to the drawings in detail, it will be seen that the embodiment of the invention which has been illustrated comprises a pair of hangers 1 of suitable metal, said hangers depending from the sides 2 of a tractor 3 at an intermediate point on said tractor. Journaled in the lower portions of the hangers 1 is a transverse shaft 4 having a laterally projecting end portion provided with a T-head 5. Rising from the projecting end portion of the shaft 4 is a pair of arms 6 the purpose of which will be presently set forth. The shaft 4 has formed therein openings 7 adjacent the outer sides of the hangers 1 for the reception of pins for retaining said shaft against endwise movement. It will be observed that the hangers 1 are in the form of channel members.

Journaled for swinging movement on the T-head 5 of the shaft 4 is a beam 8. The beam 8 is provided with a bifurcated casting 9 one end of which is journaled on the T-head 5. Pivotally mounted at an intermediate point on the forward end portion of the beam 8 is an axle 10. Journaled on the outer end portion of the axle 10 is a furrow disk or wheel 11 having a rim of substantially the shape shown to advantage in Figure 1 of the drawings. An adjusting rod 12 is operatively connected to the inner end portion of the axle 10, said rod including a threaded portion extending through a lug 13 which projects from the beam 8. Adjusting nuts 14 are provided on the rod 12 on opposite sides of the lug 13.

Rigidly secured on the lower front portions of the hangers 1 is a channel bar 15 of suitable metal. Projecting forwardly from the bar 15 is a bracket 16. Mounted beneath the bracket 16 for rotation in a horizontal plane is a plate or member 17. A stub shaft 18 rises from an intermediate portion of the plate or member 17 and is journaled in the forward end portion of the bracket 16. A link 19 operatively connects the beam 8 to the rear end portion of the plate 17.

Mounted on the lower side of the plate 17 are pairs of grooved rollers 20. The pairs of grooved rollers 20 support a longitudinally movable rod or bar 21 beneath the rotary plate 17. The forward end of the bar 21 is pivotally connected to the rear end portion of an angular arm 22 which is rigidly secured beneath the front axle 23 of the tractor 3 between the front wheels 24 of said tractor.

It is thought that the operation of the guide will be readily apparent from a consideration of the foregoing. Briefly, the wheel or disk 11 travels in a previously plowed furrow and, of course, follows the wall of said furrow. As hereinbefore stated, the angle of the furrow wheel 11 may be regulated as desired through the medium of the elements 12, 14, etc. The beam 8 is caused to swing laterally on the shaft 4 as the wheel 11 follows the furrow with the result that the plate 17 is rotated through the medium of the link 19. It will be observed that the construction and arrangement is such that the forward end of the plate 17 swings in the opposite direction from which the beam 8 is swinging. When the plate 17 is thus turned the bar 21 swings the arm 22 for turning the front wheels 24 of the tractor. It will therefore be seen that when the wheel 11 moves inwardly or to the left the tractor wheels 24 will be turned to the left and when said wheel 11 swings outwardly or to the right the tractor wheels 24 will be turned in a corresponding direction. A rod 25 is operatively connected to the arms 6 on the shaft 4. The rod 25 may be operated in any suitable manner from the driver's seat 26 of the tractor 3 for raising and lowering the beam 8 with the furrow wheel thereon. There is enough looseness or play in the end connections of the link 19 to permit sufficient lifting of the beam 8. This is also facilitated by the fact that the beam 8 is free to swing inwardly. It will be observed that no part of the guide projects forwardly beyond the front wheels of the tractor. Thus, the tractor may be driven up close to a fence, building or other obstruction before making a turn. Also, when the front wheels of the tractor are turned to the left by the driver the beam 8 with the furrow wheel 11 thereon will be swung inwardly to a position adjacent the front end portion of the tractor thereby permitting said tractor, when negotiating the left hand turn, to be driven close to a fence or building. When making a right hand turn the furrow wheel 11 is swung away from the tractor which is of no consequence because of the fact that the fence or building will then be on the left hand side.

It is believed that the many advantages of a tractor guide constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. In combination with a tractor including front steering wheels, a beam mounted for swinging movement on the tractor, a furrow wheel rotatably mounted on said beam, a member rotatably mounted on the tractor, means operatively connecting said member to the beam for rotation thereby but in the opposite direction therefrom, a bar slidably mounted on the member, and an arm fixed to the front wheels of the tractor and pivotally connected to said bar.

2. A tractor guide comprising a beam mounted for lateral swinging movement on the tractor, a furrow wheel rotatably mounted on the free end portion of said beam, a member pivotally mounted, at an intermediate point, on the tractor, a link operatively connecting one end portion of the member to the beam, a bar slidably mounted on the member, and means operatively connecting said bar to the front wheels of the tractor.

3. A tractor guide comprising a transverse shaft journaled on the tractor, a beam mounted for swinging movement on one end portion of said shaft, a furrow wheel rotatably mounted on the free end portion of said beam, a longitudinally elongated member pivotally mounted, at an intermediate point, on the tractor, pairs of rollers mounted on said member, a bar mounted for longitudinal movement on the rollers, means operatively connecting the front wheels of the tractor to the forward end portion of said bar for actuation thereby, a link operatively connecting the member to the beam for actuation thereby, and means for rotating the shaft for raising and lowering the beam.

4. A tractor guide of the class described comprising a pair of hangers depending from the sides of the tractor, a transverse shaft journaled in said hangers, a beam having one end portion journaled on the shaft for lateral swinging movement, a furrow wheel rotatably mounted on the free end portion of said beam, a transverse bar mounted on the hangers, a bracket projecting forwardly from said bar, a horizontal plate pivotally connected, at an intermediate point, to said bracket, pairs of rollers rotatably mounted beneath said plate, a longitudinally movable bar mounted between the pairs of rollers, an arm fixed to the front wheel assembly of the tractor and having one end portion pivotally connected to the bar for actuation thereby, a link operatively connecting the plate to the beam for actuation thereby in the opposite direction therefrom, and means for rotating the shaft for raising and lowering the beam.

CARL LAVON MACK.